United States Patent [19]

Kapton et al.

[11] Patent Number: 5,056,375
[45] Date of Patent: Oct. 15, 1991

[54] SPINDLE ADJUSTMENT MECHANISM

[75] Inventors: Kenneth Kapton, Verona; Stephen O. Sutton, Wexford; Barry D. Wixey, Pittsburgh, all of Pa.

[73] Assignee: Delta International Machinery Corp., Pittsburgh, Pa.

[21] Appl. No.: 525,265

[22] Filed: May 22, 1990

[51] Int. Cl.⁵ .................. F16H 29/20; B25H 1/00
[52] U.S. Cl. ................... 74/89.15; 144/286 R; 83/631
[58] Field of Search ............ 74/89.15; 144/286 R, 144/286 A, 287; 83/627, 631, 764; 269/60, 61

[56] References Cited

U.S. PATENT DOCUMENTS

| | | | |
|---|---|---|---|
| 306,407 | 10/1884 | Laufman | 74/509 |
| 2,045,422 | 6/1936 | Tautz | 144/134 |
| 2,338,271 | 1/1944 | Ulanet | 74/89.15 X |
| 2,353,202 | 7/1944 | Tautz | 144/134 |
| 2,471,014 | 5/1949 | Trebert, Jr. | 144/288 |
| 2,715,839 | 8/1955 | Springer | 74/89.15 |
| 2,743,747 | 5/1956 | Franks | 144/286 A X |
| 3,565,134 | 2/1971 | Toms | 143/6 |
| 3,803,927 | 4/1974 | Lawler | 74/89.15 |
| 4,265,283 | 5/1981 | Nash et al. | 144/286 R |
| 4,454,898 | 6/1984 | Pavnica | 144/1 |
| 4,465,114 | 8/1984 | Schumacher | 144/286 R |
| 4,509,572 | 4/1985 | L'Archer | 144/84 |
| 4,516,612 | 5/1985 | Wiley | 144/286 R X |
| 4,537,234 | 8/1985 | Onsrud | 144/134 |
| 4,546,804 | 10/1985 | Haeger | 144/287 X |
| 4,719,816 | 1/1988 | Carlnäs | 74/89.15 X |
| 4,749,013 | 6/1988 | Ducate, Sr. | 144/145 |
| 4,763,706 | 8/1988 | Rice et al. | 144/136 |

Primary Examiner—Allan D. Herrmann
Assistant Examiner—Julie Krolikowski
Attorney, Agent, or Firm—Merchant, Gould, Smith, Edell, Welter & Schmidt

[57] ABSTRACT

A spindle adjustment mechanism which includes a rotatable hand wheel, a bracket for operably retaining a spindle and a motor for driving the spindle, and an assembly for uniaxially transmuting rotation of the hand wheel to linear movement of the spindle through movement of the bracket.

5 Claims, 2 Drawing Sheets

SPINDLE ADJUSTMENT MECHANISM

FIELD OF THE INVENTION

Broadly, the invention relates to spindle adjustment mechanisms. More specifically, the invention relates to ergonomically designed spindle adjustment mechanisms which uniaxially transmute rotation of a hand wheel to vertical movement of the spindle.

BACKGROUND OF THE INVENTION

Stationary power tools typically employ a spindle to transfer rotational power from a power source to a cutting tool mounted directly upon an arbor on the spindle.

Positioning of the cutting tool with respect to a working surface is generally achieved by adjusting the position of the spindle and, consequently, the power source.

A typical spindle adjustment mechanism includes a hand crank for rotating a horizontal threaded shaft which operates a right angle gear set capable of transmuting rotational movement of the shaft to vertical movement of a bracket secured to both the spindle and the power source. The hand crank is generally inconspicuously mounted underneath the working surface, away from those areas where the operator and the workpiece would typically be situated, in order to avoid interfering with operation of the power tool.

While generally effective for providing adjustment of the spindle, such typical spindle adjustment mechanisms require inconvenient positioning, are expensive to manufacture, and are susceptible to malfunctioning.

Accordingly, a substantial need exists for a reliable, cost effective, ergonomically designed spindle adjustment mechanism.

SUMMARY OF THE INVENTION

We have discovered and developed an inexpensive yet reliable spindle adjustment mechanism which includes (i) a spindle, (ii) a rotatable hand wheel, and (iii) a means for uniaxially transmuting rotation of the hand wheel to linear movement of the spindle. In the preferred embodiment, the spindle adjustment mechanism further includes a bracket for operably retaining the spindle and a power source for rotating the spindle, and linear movement of the spindle is effected by linear movement of the bracket.

Uniaxial transmutation of rotational movement of the hand wheel to linear movement of the spindle/bracket permits the hand wheel to be conveniently mounted immediately underneath an indentation in the working surface with the outside periphery of the handwheel flush with an edge of the working surface.

BRIEF DESCRIPTION OF THE DRAWINGS

FIG. 1b is a continuation of the exploded perspective view of FIG. 1a.

DETAILED DESCRIPTION OF THE INVENTION INCLUDING A BEST MODE

Nomenclature

Figure 1A:
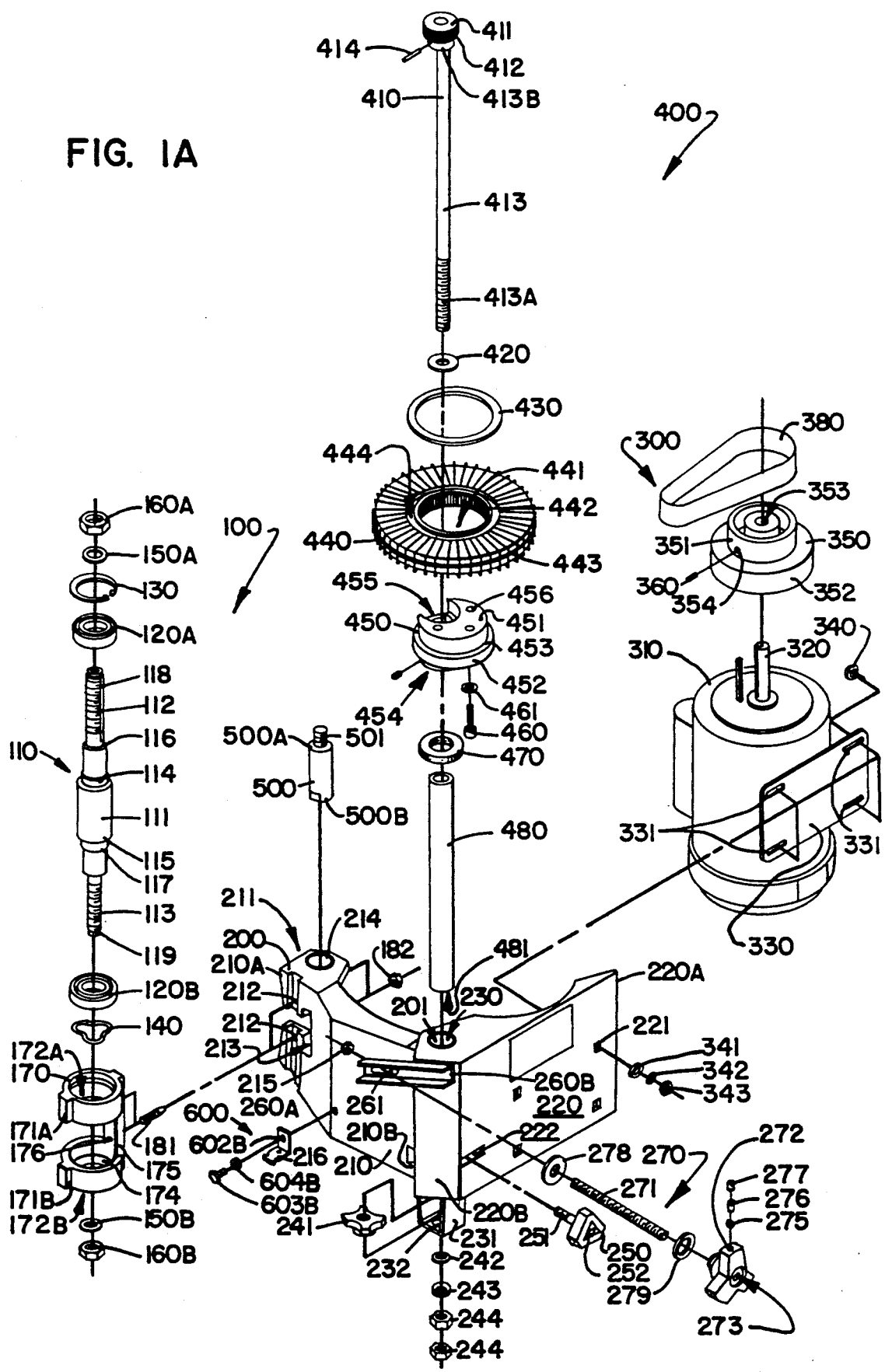
FIG. 1a is an exploded perspective view of one embodiment of the invention.
Figure 1B:
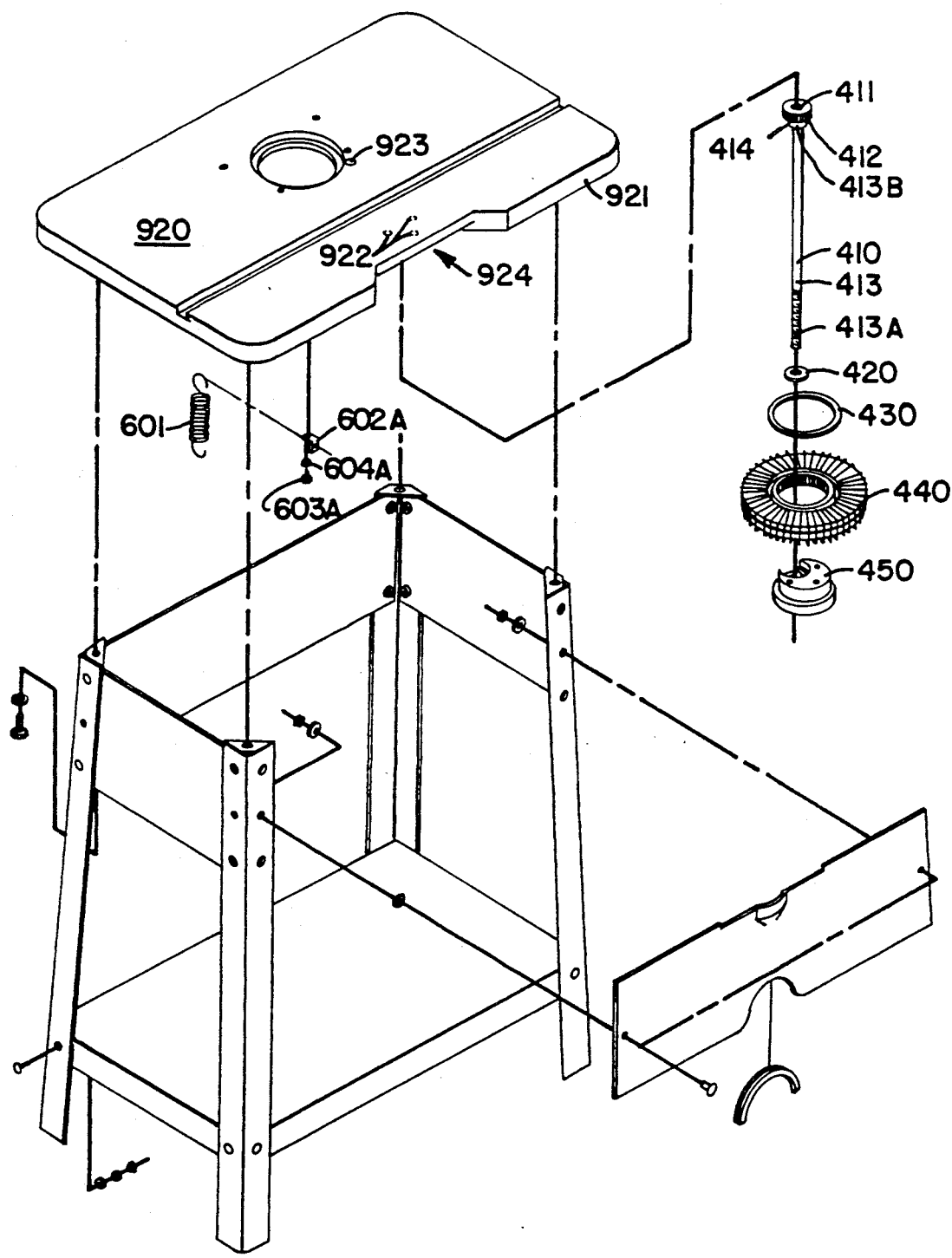

| | |
|---|---|
| 100 | spindle assembly |
| 111 | spindle |
| 111 | central section |
| 112 | large arbor |
| 113 | small arbor |
| 114 | first inner shoulder proximate large arbor |
| 115 | second inner shoulder proximate small arbor |
| 116 | first outer shoulder on large arbor |
| 117 | second outer shoulder on small arbor |
| 118 | longitudinal key slot in large arbor |
| 119 | longitudinal key slot in small arbor |
| 120a | first bearing |
| 120b | second bearing |
| 130 | retaining ring |
| 140 | wave washer |
| 150a | flat washer |
| 150b | flat washer |
| 160a | nut |
| 160b | nut |
| 170 | spindle housing |
| 171a | first retention ring |
| 171b | second retention ring |
| 172a | central orifice through first ring |
| 172b | central orifice through second ring |
| 173 | inner annular channel in first retention ring |
| 174 | inner annular flange in second retention ring |
| 175 | connecting brace |
| 176 | holes through connecting brace |
| 181 | bolts |
| 182 | nuts |
| 200 | bracket |
| 201 | pivot axis |
| 210 | spindle mounting portion of bracket |
| 210a | distal end of spindle mounting portion |
| 210b | proximal end of spindle mounting portion |
| 211 | alignment channel |
| 212 | holes through spindle mounting portion |
| 213 | belt channel through spindle mounting portion |
| 214 | passageway through spindle mounting portion |
| 215 | first threaded hole in spindle mounting portion |
| 216 | second threaded hole in spindle mounting portion |
| 220 | motor mounting portion of bracket |
| 220a | distal end of motor mounting portion |
| 220b | proximal end of motor mounting portion |
| 221 | orifices through motor mounting portion |
| 222 | threaded slot in motor mounting portion |
| 230 | guide tube passageway through bracket |
| 231 | U-shaped support bracket |
| 232 | orifice through support bracket |
| 241 | acme nut |
| 242 | retaining ring |
| 243 | grommet |
| 244 | nut |
| 250 | transmission assembly locking knob |
| 251 | shaft of transmission assembly locking knob |
| 252 | handle of transmission assembly locking knob |
| 260 | channel brace |
| 260a | distal end of channel brace |
| 260b | proximal end of channel brace |
| 261 | slot through channel brace |
| 270 | tensioning knob |
| 271 | shaft of tensioning knob |
| 272 | handle of tensioning knob |
| 273 | central hole in handle of tensioning knob |
| 274 | orifice through handle of tensioning knob |
| 275 | spherical detent |
| 276 | spring |
| 277 | machine screw |
| 278 | flat washer |
| 279 | strike plate |
| 300 | power assembly |
| 310 | motor |
| 320 | drive shaft |
| 330 | motor mounting plate |
| 331 | corner slots through motor mounting plate |
| 340 | bolts |
| 341 | flat washers |
| 342 | lock washers |
| 343 | nuts |
| 350 | drive pulley |
| 351 | low gear drive surface |
| 352 | high gear drive surface |
| 353 | central orifice through drive pulley |
| 354 | threaded hole through dirve pulley |
| 360 | machine screw |

-continued

| | |
|---|---|
| 380 | drive belt |
| 400 | spindle adjustment mechanism |
| 410 | transmission assembly |
| 411 | gear wheel |
| 412 | external teeth on small gear |
| 413 | shaft |
| 413a | distal end of shaft |
| 413b | proximal end of shaft |
| 414 | roll pin |
| 420 | thrust washer |
| 430 | spacer ring |
| 440 | hand wheel |
| 441 | central orifice through hand wheel |
| 442 | internal teeth on hand wheel |
| 443 | outer periphery of hand wheel |
| 444 | annular channel in hand wheel |
| 450 | stationary hub |
| 451 | upper portion of hub |
| 452 | lower portion of hub |
| 453 | annular shoulder on hub |
| 454 | orifice through hub |
| 455 | cylindrical cavity in hub |
| 456 | holes through hub |
| 460 | machine screws |
| 461 | lock washers |
| 470 | bumper ring |
| 480 | guide tube |
| 481 | central passageway through guide tube |
| 500 | guide rod |
| 500a | distal end of guide rod |
| 500b | proximal end of guide rod |
| 501 | threaded shaft on distal end of guide rod |
| 600 | bracket biasing assembly |
| 601 | spring |
| 602a | upper mounting bracket |
| 602b | lower mounting bracket |
| 603a | upper machine screw |
| 603b | lower machine screw |
| 604a | upper flat washer |
| 604b | lower flat washer |
| 920 | working surface |
| 921 | front of working surface |
| 922 | first threaded hole in working surface |
| 923 | second threaded hole through working surface |
| 924 | indentation in front of working surface |

Construction

The invention is directed to a spindle adjustment mechanism 400 operable for adjusting the position of a spindle assembly 100 relative to a working surface 920. Specifically, the spindle adjustment mechanism 400 is operable for adjusting the position of a bracket 200 which operably retains both the spindle assembly 100 and the motor 310 for rotating the spindle assembly 100.

The adjustment mechanism 400 is functional for adjusting the position of substantially any spindle assembly 100 in any vertical/horizontal direction. Without intending to be unduly limited, the embodiment of the adjustment mechanism 400 described herein and depicted in the Figures is employed to vertically adjust the dual arbor spindle assembly 100 disclosed in commonly owned and copending U.S. Patent Application Ser. No. 07/525,238, entitled DUAL ARBOR SPINDLE filed upon the same date as the present application, which is hereby incorporated by reference.

The spindle 100 is driven by a power assembly 300 which includes an electric motor 310, a two-speed drive pulley 350 rotatably mounted upon the drive shaft 320 of the electric motor 310, and a belt 380 passing through a belt channel 213 in the bracket 200 and encircling both the drive pulley 350 and the central section 111 of the spindle 110.

The spindle assembly 100 and power assembly 300 are independently mounted upon a bracket 200 which includes a spindle mounting portion 210 and a motor mounting portion 220 pivotally coupled to each other about a pivot axis 201 at the proximal end 210b,220b of each portion 210,220. The spindle assembly 100 is mounted to the distal end 210a of the spindle mounting portion 210 by a pair of bolts 181 which extend through axially aligned holes 176 and 212 in the connecting brace 172 of the spindle housing 170 and the spindle mounting portion 210 of the bracket 200. The protruding end of the bolts 181 are threadably engaged by a nut 182 to secure the bolts 181 in place.

Appropriate alignment of the spindle assembly 100 with respect to the bracket 200 is provided by an alignment channel 211 in the spindle mounting portion 210 of bracket 200. The alignment channel 211 is sized to provide for the snug retention of brace 172 within the channel 211.

The motor 310 is mounted to the distal end 220a of the motor mounting portion 220 by a set of bolts 340 which extend through axially aligned corner slots 331 in a mounting plate 330 welded to the side of the motor 310 and orifices 221 through the motor mounting portion 220 of the bracket 200. A flat washer 341 and lock washer 342 are placed over the protruding end of the bolts 340 and then threadably engaged by a nut 343 for securing the bolts 340 in place.

The spindle mounting portion 210 and the motor mounting portion 220 of the bracket 200 are pivotally connected about a tubular passageway 230 which defines a pivot axis 201. The pivotability of the two mounting portions 210,220 with respect to one another provides for tensioning control of the drive belt 380 between the drive pulley 350 on the motor 310 and the spindle 110 by pivoting the two portions 210,220 so as to increase/decrease the distance between the spindle assembly 100 and the power assembly 300.

Tension control of the drive belt 380 is provided by a tensioning knob 270 which consists of an elongated threaded shaft 271 coupled at one end to a combination strike plate 279 and handle 272 by means of a spherical detent 275, spring 276 and a machine screw 277 retained within an orifice 274 in the handle 272. The other end of the shaft 271 extends through a slot 261 in the distal end 260a of a channel brace 260 extending from the motor mounting portion 220 of the bracket 200 and into a threaded hole 215 in the spindle mounting portion 210 of the bracket 200.

Tensioning of the drive belt 380 is achieved by rotating the tensioning knob 270 clockwise within the threaded hole 215 in the spindle mounting portion 210 of the bracket 200 so as to compel the strike plate 279 towards the spindle mounting portion 210 of the bracket 200. As the strike plate 279 moves towards the spindle mounting portion 210 of the bracket 200, the strike plate 279 eventually contacts the distal end 260a of the channel brace 260 and forces the distal end 260a of the channel brace 260 towards the spindle mounting portion 210 of the bracket 200. Such movement of the channel brace 260 causes the motor mounting portion 220 to pivot about the pivot axis 201 relative to the spindle mounting portion 210 so as to increase the distance between the spindle assembly 100 and the power assembly 300 connected to distal ends 210a,220a of the spindle mounting and motor mounting portions 210,220.

The adjustment mechanism 400 controls the height of the bracket 200 and hence the spindle assembly 100 with respect to the work surface 920.

The adjustment mechanism 400 is constructed about a stationary hub 450 which is mounted to the bottom of the work surface 920 by a set of machine screws 460 extending through holes 456 in the hub 450 and into threaded holes 922 in the work surface 920.

An annular hand wheel 440 having internal teeth 442 along the inner periphery is rotatably mounted between the bottom of the work surface 920 and an annular shoulder 453 on the stationary hub 450 with the upper portion 451 of the hub within the central orifice 441 in the hand wheel 440 for rotation about the hub 450. A spacer ring 430 constructed from a felt type material is retained within an annular channel 444 in the upper surface of the hand wheel 440 for buffering contact between the hand wheel 440 and the work surface 920.

Rotation of the hand wheel 440 is uniaxially converted to linear movement of the bracket 200 and hence the spindle 110 by a transmission assembly 410 consisting of a gear wheel 411 with external teeth 412 attached to the proximal end 413b of a shaft 413. The gear wheel 411 is rotatably retained within a cylindrical cavity 455 in the top of the hub 450 for cooperatively engaging the internal teeth 442 of the hand wheel 440 such that rotation of the hand wheel 440 causes rotation of the small gear 411. The shaft 413 extends from the gear wheel 411 and sequentially passes through (i) an orifice 454 in the stationary hub 450, (ii) a bumper ring 470, (iii) a guide tube 480 slidably retained within the tubular passageway 230 in the bracket 200, (iv) an Acme nut 241, (v) an orifice 232 in a U-shaped support bracket 231 coupled to the motor mounting portion 220 of the bracket 200 immediately below the tubular passageway 230 through the bracket 200, (vi) a retaining ring 242, (vii) a grommet 243, and (viii) a pair of nuts 244. The distal end 413a of the shaft 413 is threaded and threadably engages the Acme nut 241, the retaining ring 242, and the pair of nuts 244.

The Acme nut 241 is retained within the support bracket 231 such that the Acme nut 241 is prevented from rotating with the shaft 413 of the transmission assembly 410 and serves to force the bracket 200 downward away from the work surface 920 when the shaft 413 of the transmission assembly 410 is rotated in a first direction. In a similar fashion, the retaining ring 242 does not rotate with the shaft 413 of the transmission assembly 410 and serves to force the bracket 200 upward toward the work surface 920 when the shaft 413 of the transmission assembly 410 is rotated in a second direction.

The spindle adjustment mechanism 400 may be locked in place by clockwise rotation of a transmission assembly locking knob 250 which has a threaded shaft 251 extending into the guide tube passageway 230 through a threaded slot 222 in the motor mounting portion 220 of the bracket for pressing against the shaft 413 of the transmission assembly 410.

The hand wheel 440 is conveniently located within an indentation 924 in the front edge 921 of the working surface 920 with the outer periphery 443 of the hand wheel 440 protectively placed inside the front edge 921 of the work surface 920 to prevent accidental rotation of the hand wheel 440. The indentation 924 facilitates access to the hand wheel 440 while permitting the hand wheel 440 to be protectively positioned inside the front edge 921 of the work surface 920.

A guide rod 500 stabilizes linear movement of the bracket 200 by providing a second stable post upon which the bracket 200 may travel. The distal end 500a of the guide rod 500 includes a threaded shaft 501 which threadably engages the work surface 920 through a second threaded aperture 923 in the work surface 920. The proximal end 500b of the guide rod 500 slidably extends into a guide rod passageway 214 in the distal end 210a of the spindle mounting portion 210 of the bracket 200.

Upward movement of the heavy spindle assembly 100, power assembly 300 and bracket 200 is facilitated by a bracket biasing assembly 600 which includes a spring 601 attached to the work surface 920 at one end and the bracket 200 at the other end. The spring 601 is mounted to the work surface 920 by an upper spring mount 602a connected to the work surface 920 by a machine screw 603a and mounted to the bracket 200 by a lower spring mount 602b connected to the bracket 200 by a machine screw 603b. The spring 601 biases the bracket 200 towards the work surface 920 so as to counter balance the effect of gravity.

In order to provide appropriate sensitivity to positioning of the spindle 110 the ratio of rotational distance traveled by the outside periphery of the hand wheel 440 to the linear distance travelled by the bracket 200 is preferably about 1:1 to about 20:1. This ratio is affected by both the rotational ratio between hand wheel 440 and the small gear 411 and the flight of the threads on the distal end 413a of the shaft 413.

The components of this systems may be constructed from any material possessing sufficient structural integrity including metals such as steel and aluminum and plastics such as polyester and nylon.

The specification is provided to aid in a complete nonlimiting understanding of the invention. Since many variations and embodiments of the invention may be made without departing from the spirit and scope of the invention, the invention resides in the claims hereinafter appended.

We claim:

1. A spindle adjustment mechanism, comprising: a rotatable handwheel; a bracket for rotatably retaining a spindle and operably retaining a motor for rotatably driving the spindle; and a means for uniaxially transmuting rotation of the handwheel to linear movement of the bracket which includes a spur gear in communication with the handwheel such that rotation of the handwheel effects rotation of the spur gear, and a shaft having a first end coupled to the spur gear and a second end threadably engaged to the bracket whereby rotation of the spur gear effects rotation of the shaft which causes linear movement of the bracket along the shaft.

2. The adjustment mechanism of claim 1 wherein the rotatable handwheel has an inner orifice defining a toothed inner periphery; and the transmuting means includes the spur gear is configured and arranged to gear with the toothed inner periphery of the handwheel.

3. The adjustment mechanism of claim 1 wherein the ratio of the rotational distance traveled by the outside periphery of the handwheel and the linear distance traveled by the bracket is about 1:1 to about 20:1.

4. The adjustment mechanism of cl aim 1 wherein the handwheel is horizontally mounted immediately underneath a horizontal workpiece support surface with the outside periphery of the handwheel flush with a front edge of the workpiece support surface and a segment of the handwheel operably exposed by an indentation in the front edge of the workpiece support surface.

5. A spindle adjustment mechanism, comprising: a rotatable handwheel; a bracket divided into first and second portions hinged about a pivot axis and operable for retaining a spindle on the first portion and a motor for rotatably driving the spindle on the second portion; and a means for uniaxially transmuting rotational movement of the handwheel to linear movement of the bracket which includes a shaft extending from the handwheel to the bracket along the pivot axis.

* * * * *

UNITED STATES PATENT AND TRADEMARK OFFICE
CERTIFICATE OF CORRECTION

PATENT NO. : 5,056,375

DATED : October 15, 1991

INVENTOR(S) : Kapton et al.

It is certified that error appears in the above-identified patent and that said Letters Patent is hereby corrected as shown below:

In column 6, line 29, please delete "systems" and substitute therefore--system--.

In column 6, line 62, claim 4, please delete "cl aim" and substitute therefore--claim--.

Signed and Sealed this

Second Day of March, 1993

Attest:

STEPHEN G. KUNIN

*Attesting Officer*  *Acting Commissioner of Patents and Trademarks*